(12) United States Patent
Rinker et al.

(10) Patent No.: US 12,555,798 B2
(45) Date of Patent: Feb. 17, 2026

(54) METAL-POLYMER HYBRID CURRENT COLLECTOR FOR AN ELECTRODE OF A BATTERY AND METHOD OF MANUFACTURE

(71) Applicant: GM GLOBAL TECHNOLOGY OPERATIONS LLC, Detroit, MI (US)

(72) Inventors: Teresa J. Rinker, Royal Oak, MI (US); Erik D. Huemiller, Waterford, MI (US); Vijay P. Saharan, Grand Blanc, MI (US); Jesse M. Roy, Madison Heights, MI (US); Thomas J. Chapaton, Sterling Heights, MI (US); Jeffrey A Abell, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 880 days.

(21) Appl. No.: 17/548,848

(22) Filed: Dec. 13, 2021

(65) Prior Publication Data

US 2023/0187654 A1  Jun. 15, 2023

(51) Int. Cl.
*H01M 4/66* (2006.01)

(52) U.S. Cl.
CPC .......... *H01M 4/667* (2013.01); *H01M 4/662* (2013.01)

(58) Field of Classification Search
CPC ..................................... H01M 4/667
See application file for complete search history.

(56) References Cited

U.S. PATENT DOCUMENTS

2012/0208082 A1\*  8/2012  Honda .................... H01M 4/60
429/210

FOREIGN PATENT DOCUMENTS

| CN | 110660998 | A | \* | 1/2020 | ........ H01M 10/0525 |
| CN | 112259742 | A | \* | 1/2021 | ............. B60L 50/64 |
| DE | 102019105119 | A1 | \* | 9/2020 | .......... H01M 50/581 |

\* cited by examiner

*Primary Examiner* — Stephan J Essex
(74) *Attorney, Agent, or Firm* — Quinn IP Law

(57) ABSTRACT

The concepts described herein provide a hybrid metal/polymer current collector for a battery cell electrode that includes a collector body joined to a tab portion and encased in an electrically conductive overlay, and an associated method of manufacture. The tab portion is fabricated from a homogeneous electrically conductive material, the collector body is fabricated from a polymer, and the collector body is joined to the tab portion at a junction.

18 Claims, 4 Drawing Sheets

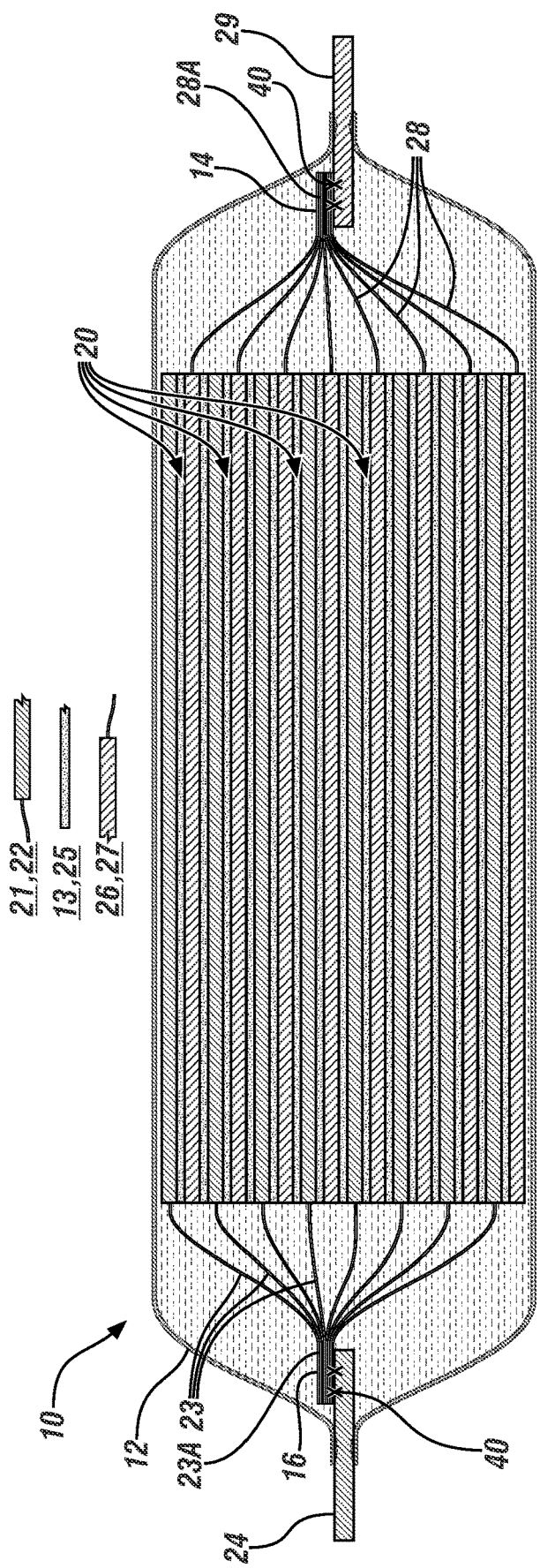
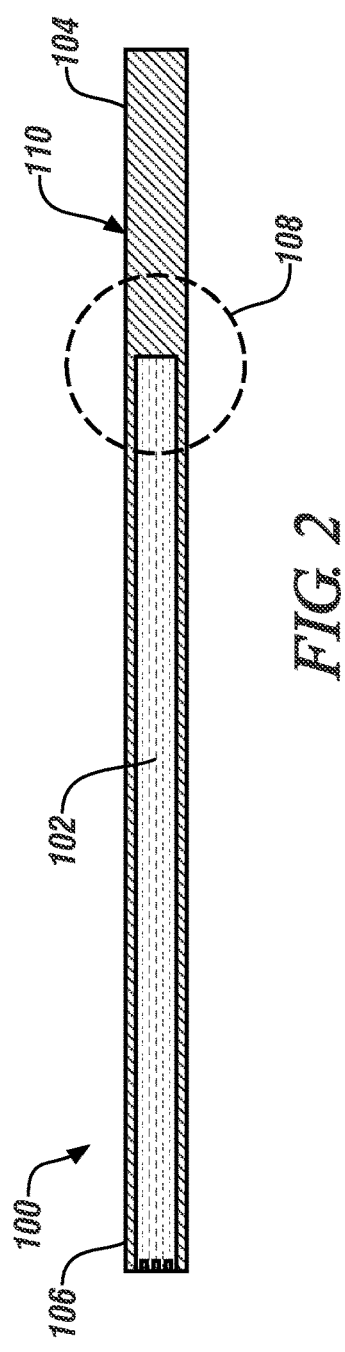
FIG. 1
FIG. 2

METAL-POLYMER HYBRID CURRENT COLLECTOR FOR AN ELECTRODE OF A BATTERY AND METHOD OF MANUFACTURE

INTRODUCTION

Lithium ion battery packs for vehicle and other high-power applications may include multiple lithium ion battery cells that are electrically connected. Each cell includes a plurality of lithium ion electrode pairs that are enclosed within a sealed pouch envelope. Each electrode pair includes a negative electrode, a positive electrode, and a separator that physically separates and electrically isolates the negative and positive electrodes.

Electrode pairs are electrically connected in parallel to electrochemically store and release electric power. Each electrode pair includes an anode and a cathode with a separator disposed in between. Each anode has an anode current collector with a negative foil including a tab portion, and each cathode has a cathode current collector with a positive foil including a tab portion. The negative foils of the anodes of the plurality of electrode pairs are electrically connected in parallel and electrically connected to a negative terminal tab that protrudes through the pouch, and the positive foils of the cathodes of the plurality of electrode pairs are electrically connected in parallel, and electrically connected to a positive terminal tab that protrudes through the pouch.

Within each battery cell, the negative terminal tab electrically communicates with the negative current collectors that contact and exchange electrons with the negative electrodes of the electrode pairs, and the positive terminal tab electrically communicates with the positive current collectors that contact and exchange electrons with the positive electrodes of the electrode pairs.

Each of the current collectors includes a planar foil portion and a tab portion that are arranged in contact with one of the electrodes.

Tabs of the negative foils of the anodes of the plurality of electrode pairs may be electrically connected in parallel and electrically connected to the negative terminal tab, e.g., by laser welding. Likewise, tabs of the positive foils of the anodes of the plurality of electrode pairs may be electrically connected in parallel and electrically connected to the positive terminal tab, e.g., by laser welding. Laser welding is a metal joining process in which a laser beam is directed at a stack of metal workpieces to provide a concentrated energy source capable of generating a fusion weld joint between the overlapping constituent metal workpieces.

There is a need for a hybrid current collector having a solid metal tab portion, in order to obtain benefit from a polymeric collector body while enhancing weldability of the tab portion.

SUMMARY

The concepts described herein provide a hybrid current collector for a battery cell electrode that includes a collector body joined to a tab portion and encased in an electrically conductive overlay. The tab portion is fabricated from a homogeneous electrically conductive material, the collector body is fabricated from a polymer, and the collector body is joined to the tab portion at a junction.

An aspect of the disclosure includes the electrically conductive overlay encasing the tab portion and the collector body.

Another aspect of the disclosure includes the electrically conductive overlay being one of aluminum, aluminum alloy, copper, or copper alloy.

Another aspect of the disclosure includes the tab portion being fabricated from one of aluminum, aluminum alloy, nickel, copper, or copper alloy.

Another aspect of the disclosure includes the tab portion being a conductive polymer.

Another aspect of the disclosure includes the conductive polymer having a color dye embedded therein.

Another aspect of the disclosure includes the tab portion having a weld zone, wherein the junction is distal to the weld zone of the tab portion.

Another aspect of the disclosure includes the polymer of the planar portion being one of polyethylene, polyester, nylon, or polyamide materials.

Another aspect of the disclosure includes the collector body being arranged as a planar element.

Another aspect of the disclosure includes the collector body being a planar element that is arranged as a laminated structure, with a conductive polymeric film having a first portion of the polymer disposed on a first face and a second portion of the polymer disposed on a second, opposed face.

Another aspect of the disclosure includes the collector body being a laminated structure including a metallic film having a first portion of the polymer disposed on a first face and a second portion of the polymer disposed on a second, opposed face.

Another aspect of the disclosure includes a battery cell that includes a hybrid current collector that is arranged adjacent to an electrode. The hybrid current collector includes a collector body joined to a tab portion, and encased in an electrically conductive overlay. The tab portion is fabricated from a homogeneous electrically conductive material, the collector body is fabricated from a polymer, and the collector body is joined to the tab portion at a junction.

Another aspect of the disclosure includes a method for forming a hybrid current collector for a battery electrode that includes fabricating a collector body from a polymer, fabricating a tab portion from a conductive material, adjoining the collector body and the tab portion, joining the collector body to the tab portion to form a workpiece, and encasing the workpiece in an electrically conductive overlay material.

Another aspect of the disclosure includes joining the collector body to the tab portion by executing a roll bond welding process at an elevated temperature and pressure at a location where the collector body adjoins the tab portion.

Another aspect of the disclosure includes joining the collector body to the tab portion by executing an ultrasonic seam welding process at a location where the collector body adjoins the tab portion.

Another aspect of the disclosure includes joining the collector body to the tab portion by executing a laser welding process at a location where the collector body adjoins the tab portion.

Another aspect of the disclosure includes adjoining the collector body and the tab portion by overlapping a portion of the collector body and a portion of the tab portion.

Another aspect of the disclosure includes encasing the workpiece with the electrically conductive overlay material via a vacuum deposition process.

Another aspect of the disclosure includes the tab portion having a weld zone, and joining the collector body to the tab portion distal to the weld zone of the tab portion.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 1 schematically shows a cutaway side-view of a battery cell that includes positive and negative battery tabs and electrode pairs that are arranged in a stack, in accordance with the disclosure.

FIG. 2 schematically illustrates an embodiment of a metal/polymer hybrid current collector, in accordance with the disclosure.

Figure 3A:
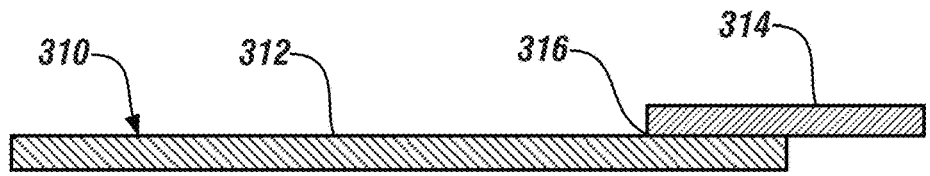
FIGS. 3A through 3G schematically illustrate embodiments of a hybrid current collector that includes a collector body adjoining a tab portion at an interface, prior to undergoing a joining process.

The appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, over, above, below, beneath, rear, and front, may be employed to assist in describing the drawings. These and similar directional terms are illustrative, and are not to be construed to limit the scope of the disclosure. Furthermore, the disclosure, as illustrated and described herein, may be practiced in the absence of an element that is not specifically disclosed herein.

Referring to the drawings, wherein like reference numerals correspond to like or similar components throughout the several Figures, FIG. 1 schematically illustrates an embodiment of a prismatically-shaped battery cell 10 that includes a plurality of electrode pairs 20 that are arranged in a stack and sealed in a flexible pouch 12 containing an electrolytic material 13. Each of the electrode pairs 20 includes an anode 21 arranged on an anode (or negative) current collector 22, and a cathode 26 arranged on a cathode (or positive) current collector 27, and are separated by a separator 25. In one embodiment, the battery cell 10 is a lithium ion battery cell. Alternatively, the battery cell may be a lithium metal battery cell or an all-solid state battery arrangement, within the scope of the disclosure.

Each of the anode current collectors 22 includes a foil portion 23 having a first, positive tab portion 23A, and may be fabricated from copper, a copper alloy, or another material.

A stack 16 of the first, positive tab portions 23A are welded at junction 40 to a first, positive battery cell tab 24 that protrudes from the flexible pouch 12.

Each of the cathode current collectors 27 includes a foil portion 28 having a second, negative tab portion 28A, and may be fabricated from aluminum or an aluminum alloy in one embodiment.

A stack 14 of the second, negative tab portions 28A are welded at junction 40 to a second, negative battery cell tab 29 that protrudes from the flexible pouch 12.

The negative and positive current collectors 22, 27 are thin hybrid metal/polymer plates that contact their respective negative and positive electrodes 21, 26 over an appreciable interfacial surface area. The purpose of these hybrid metal/polymer current collectors 22, 27 is to exchange free electrons with their respective negative and positive electrodes 21, 26 during discharging and charging of the electrode pairs 20. The thickness of each of the negative and the positive current collectors 22, 27 may be between 5 µm and 22 µm.

The negative foils 23 protrude away from the electrode pairs 20 and are positioned in overlapping alignment with one another. The positive foils 28 also protrude away from the electrode pairs 20 and are positioned in overlapping alignment with one another. The aligned sets of negative and positive foils 23, 28 are separated from each other either on different sides of the electrode pairs 20 (as shown), or are on the same side of the electrode pairs 20.

The first, positive battery cell tab 29 is a planar sheet that is fabricated from aluminum or an aluminum alloy, and has a thickness at or near 0.4 mm. The second, negative battery cell tab 24 is a planar sheet that is fabricated from copper, a copper alloy, a nickel-coated copper, or another material, and has a thickness at or near 0.2 mm. The first and second battery cell tabs 29, 24 may have other features that are relevant to mechanical, electrical and packaging functions within a battery assembly.

FIG. 2 schematically illustrates an embodiment of a metal/polymer hybrid current collector (hybrid current collector) 100, which may be configured as either the negative current collector 22 or the positive current collector 27 that is described with reference to FIG. 1. The hybrid current collector 100 includes a collector body 102 that is joined to a tab portion 104. The collector body 102 and the tab portion 104 are completely encased in an electrically conductive overlay material 106. In one embodiment the collector body 102 and the tab portion 104 are completely encased in the electrically conductive overlay material 106 employing a vapor deposition process.

The tab portion 104 is fabricated from a homogeneous electrically conductive material such as aluminum, an aluminum alloy, copper, a copper alloy, nickel-coated copper, a conductive polymer film, or a conductive polymer film including a color dye. Additional details are described with reference to FIGS. 3A-3G. The collector body 102 is fabricated from a polymer, such as polyethylene, polyolefin, polyester, polyethylene terephthalate, nylon, or polyamide materials, or another material.

The collector body 102 being fabricated from polymer facilitates melting and electrical decoupling in localized areas that may be overheating, thus preventing a thermal runaway event, while the tab portion being fabricated from a homogeneous electrically conductive material enables welding of the tab portions of the foil current collectors.

The collector body 102 is joined to the tab portion 104 at a junction 108. The junction 108 is arranged to be distal from a weld zone 110 on the tab portion 104, wherein distal means the junction 108 is sufficiently displaced from the weld zone 110 so as to minimize or avoid a magnitude of heat transfer during the tab welding process that may cause an increase in temperature at the junction 108 that may result in reversing the material joining at junction 108, destabilizing the polymer material of the collector body 102, delaminating the elements at the junction 108, or otherwise undoing the junction 108. The location of the junction 108 may be anywhere between the end of the coated active material and the weld zone 108, and is not limited to the location that is depicted in the Figures.

The electrically conductive overlay material 106 may include, e.g., aluminum, aluminum alloy, nickel, copper, nickel-coated copper, or copper alloy, and is the same material or similar material to the material employed by the respective tab portion 104.

Figure 4A:
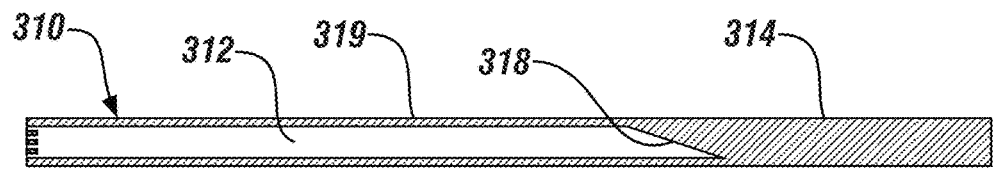
FIGS. 4A through 4G schematically illustrate embodiments of a hybrid current collector with a collector body having been joined, by a joining process, to a tab portion at an interface to form a junction, and encased in an electrically conductive overlay material.
Figure 4B:
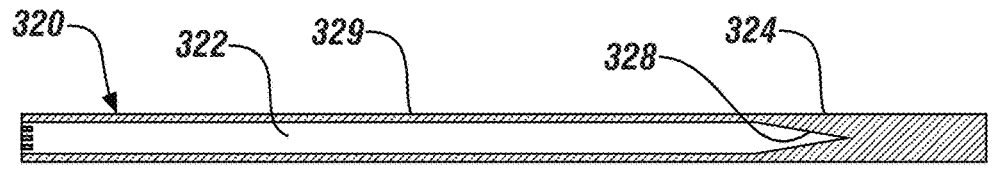
Figure 4C:
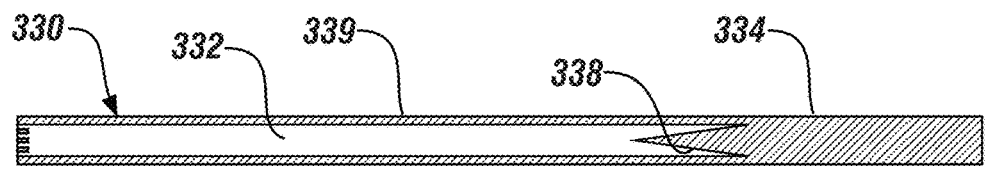
Figure 4D:
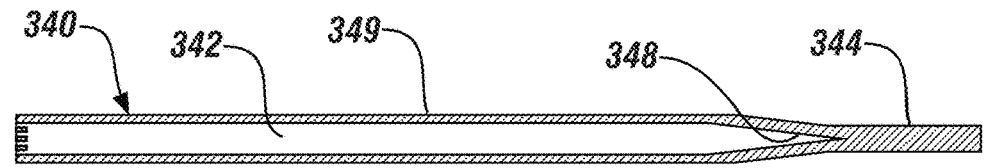
Figure 4E:
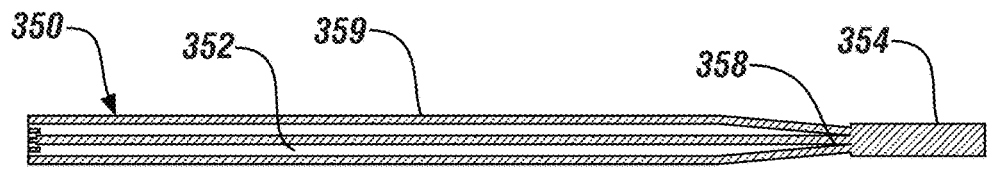
Figure 4F:
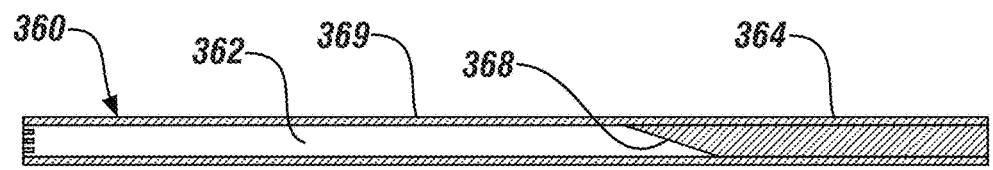
Figure 4G:
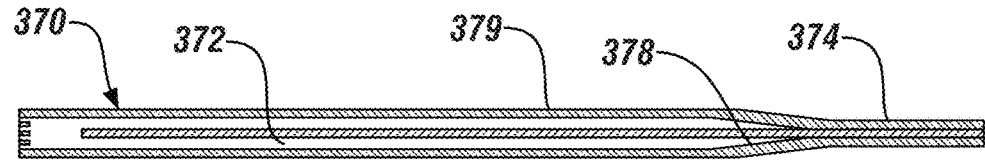
Figure 5:
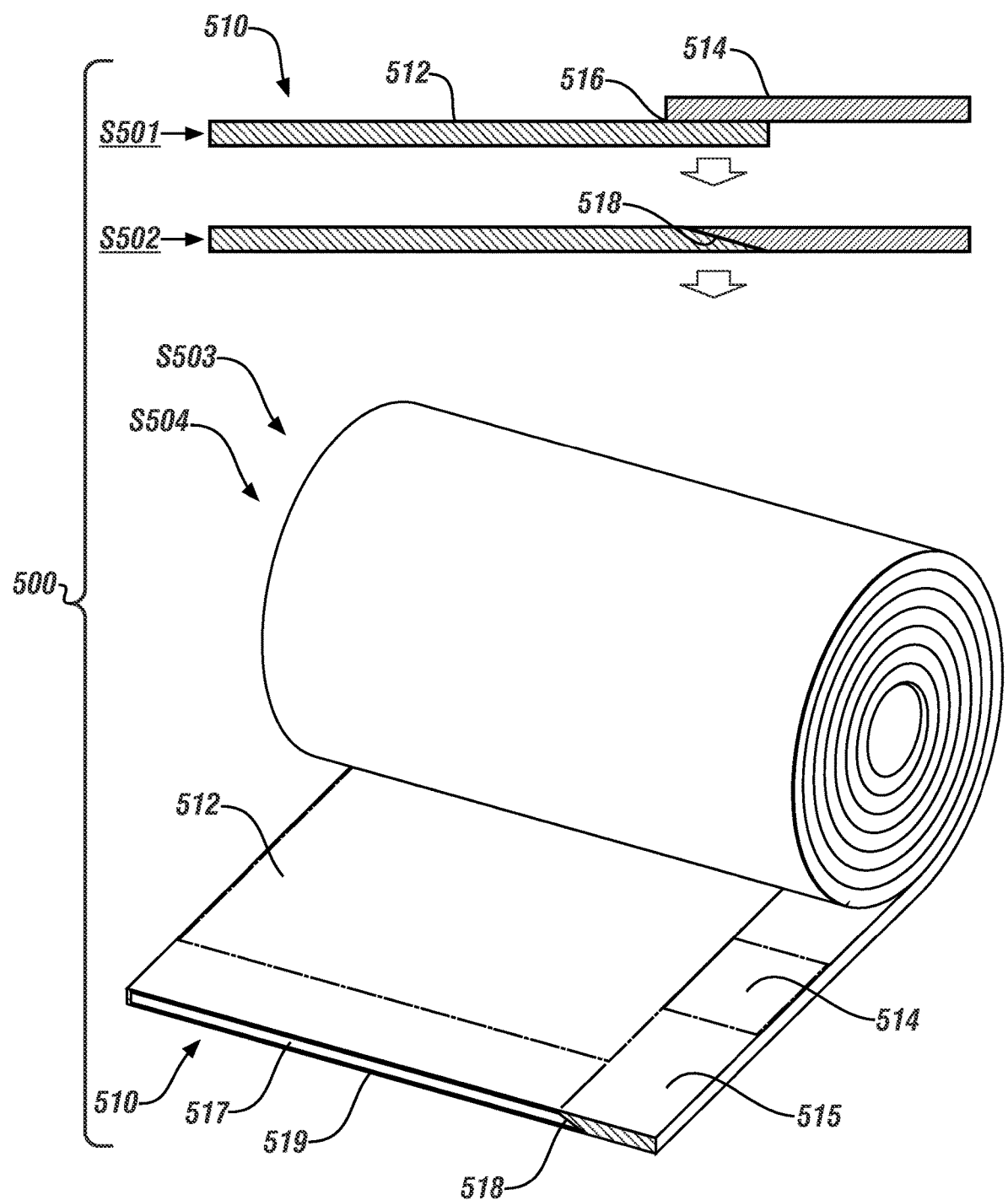
FIG. 5 pictorially illustrates a process for forming an embodiment of the hybrid current collector.

FIGS. 3A-3G schematically illustrate various embodiments of a hybrid current collector that includes a collector body adjoining a tab portion at a junction prior to undergoing a joining process. FIGS. 4A-4G schematically illustrate various embodiments of a hybrid current collector that includes a collector body that has been joined to a tab portion to form a respective junction, after undergoing a joining process. FIG. 5 schematically illustrates an embodiment of the joining process 500.

In one embodiment, the joining process for joining the collector body to the tab portion includes executing a roll bond welding process at an elevated temperature and pressure at an interface where the collector body adjoins the tab portion.

In one embodiment, the joining process for joining the collector body to the tab portion includes executing an ultrasonic seam welding process at an interface where the collector body adjoins the tab portion.

In one embodiment, the joining process for joining the collector body to the tab portion includes executing a laser welding process at an interface where the collector body adjoins the tab portion.

In one embodiment, the joining process for joining the collector body to the tab portion includes applying an adhesive material at an interface where the collector body adjoins the tab portion. The adhesive improves the strength of the bond between the polymer and the tab material during material handling and use.

In one embodiment, the joining process for joining the collector body to the tab portion includes applying an adhesive material at an interface where the collector body adjoins the tab portion in combination with executing a roll bond welding process, or executing a laser welding process, or executing an ultrasonic seam welding process.

FIG. 3A schematically illustrates an embodiment of a hybrid current collector 310 that includes a collector body 312 adjoining a tab portion 314 at an interface 316. In this embodiment, the tab portion 314 is fabricated from metal, e.g., aluminum, aluminum alloy, copper, or copper alloy, and the collector body 312 is formed from a polymer. In this embodiment, the interface 316 is a single-sided overlapping interface. FIG. 4A schematically illustrates the hybrid current collector 310 with the collector body 312 having been joined, by the joining process, to the tab portion 314 at interface 316 to form the junction 318, and encased in an electrically conductive overlay material 319.

Figure 3B:
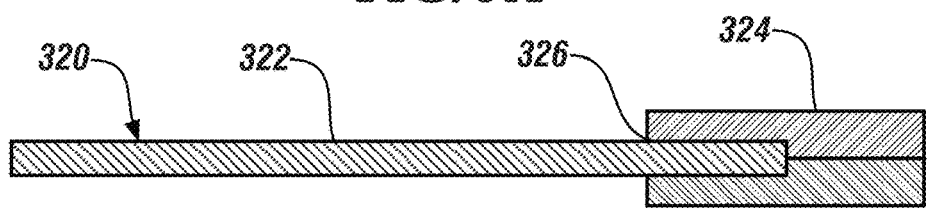

FIG. 3B schematically illustrates another embodiment of a hybrid current collector 320 that includes a collector body 322 adjoining a tab portion 324 at an interface 326. In this embodiment, the tab portion 324 is fabricated from metal, e.g., aluminum, aluminum alloy, copper, or copper alloy, and the collector body 322 is formed from a polymer. In this embodiment, the interface 326 is a double-sided overlapping interface, wherein the tab portion 324 is arranged on an upper side and a lower side of the collector body 322. FIG. 4B schematically illustrates the hybrid current collector 320 with the collector body 322 having been joined, by the joining process, to the tab portion 324 at interface 326 to form the junction 328, and encased in an electrically conductive overlay material 329.

Figure 3C:

FIG. 3C schematically illustrates another embodiment of a hybrid current collector 330 that includes a collector body 332 adjoining a tab portion 334 at an interface 336. In this embodiment, the tab portion 334 is fabricated from metal, e.g., aluminum, aluminum alloy, copper, or copper alloy, and the collector body 332 is formed from a polymer. In this embodiment, the interface 336 is an extended double-sided overlapping interface, wherein a portion the tab portion 334 is arranged on an upper side and a lower side of the collector body 332 and extends along a substantial portion of the collector body 332. FIG. 4C schematically illustrates the hybrid current collector 330 with the collector body 332 having been joined, by the joining process, to the tab portion 334 at interface 336 to form the junction 338, and encased in an electrically conductive overlay material 339.

Figure 3D:
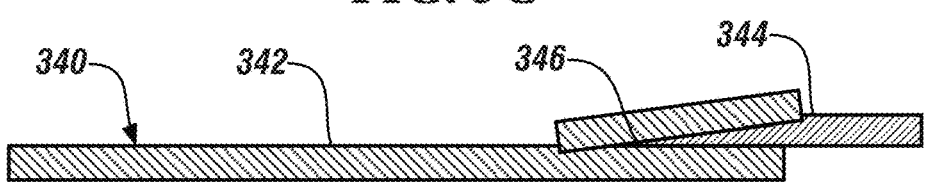

FIG. 3D schematically illustrates another embodiment of a hybrid current collector 340 that includes a collector body 342 adjoining a tab portion 344 at an interface 346. In this embodiment, the tab portion 344 is fabricated from metal, e.g., aluminum, aluminum alloy, copper, or copper alloy, and the collector body 342 is formed from a polymer. In this embodiment, the interface 346 is another double-sided overlapping interface, wherein portions of the collector body 342 are arranged on an upper side and a lower side of the tab portion 344. FIG. 4D schematically illustrates the hybrid current collector 340 with the collector body 342 having been joined, by the joining process, to the tab portion 344 at interface 346 to form the junction 348, and encased in an electrically conductive overlay material 349.

Figure 3E:

FIG. 3E schematically illustrates another embodiment of a hybrid current collector 350 that includes a collector body 352 adjoining a tab portion 354 at an interface 356. In this embodiment, the tab portion 354 is fabricated from metal, e.g., aluminum, aluminum alloy, copper, or copper alloy, and the collector body 352 is formed from a polymer. In this embodiment, the tab portion 354 extends the length of the hybrid current collector 350, and the collector body 352 is arranged on an upper side and a lower side of the tab portion 354. FIG. 4E schematically illustrates the hybrid current collector 350 with the collector body 352 having been joined, by the joining process, to the tab portion 354 all along the tab portion, including at interface 356 to form the junction 358, and encased in an electrically conductive overlay material 359.

Figure 3F:
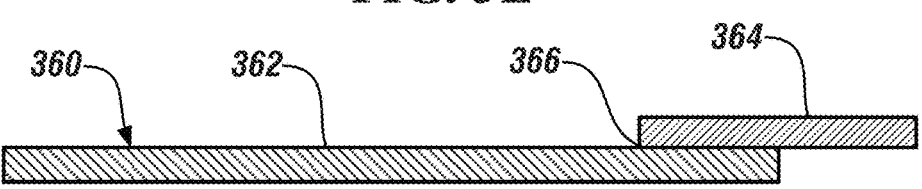

FIG. 3F schematically illustrates an embodiment of a hybrid current collector 360 that includes a collector body 362 adjoining a tab portion 364 at an interface 366. In this embodiment, the tab portion 364 is fabricated from a conductive polymeric material, e.g., polymer that has been infused with one of aluminum, aluminum alloy, copper, or copper alloy, and the collector body 362 is formed from a polymer. In this embodiment, the interface 366 is a single-sided overlapping interface. FIG. 4F schematically illustrates the hybrid current collector 360 with the collector body 362 having been joined, by the joining process, to the tab portion 364 at interface 366 to form the junction 368. In one embodiment, the conductive polymeric material is also infused with a dye material to provide a visual indication of the extent of the tab portion 364, and encased in an electrically conductive overlay material 369.

Figure 3G:

FIG. 3G schematically illustrates another embodiment of a hybrid current collector 370 that includes a collector body 372 adjoining a tab portion 374 at an interface 376. In this embodiment, the tab portion 374 is fabricated from a conductive polymeric material, e.g., a polymer that has been infused with one of aluminum, aluminum alloy, copper, or copper alloy, and the collector body 372 is formed from a polymer. In this embodiment, the tab portion 374 extends the length of the hybrid current collector 370, and the collector body 372 is arranged on an upper side and a lower side of the tab portion 374. FIG. 4G schematically illustrates the hybrid current collector 370 with the collector body 372 having been joined, by the joining process, to the tab portion 374 all along the tab portion, including at interface 376 to form the junction 378, and encased in an electrically conductive overlay material 379.

FIG. 5 pictorially illustrates an embodiment of a process 500 for forming an embodiment of the hybrid current collector 510 that is described herein. The process 500 includes placing a polymeric collector body 512 so that it adjoins a metal or metallized polymer tab portion 514 at interface 516 (S501). In this embodiment, the interface 516 is a single-sided overlapping interface. It is appreciated that the arrangement of the collector body 512 adjoining the tab portion 514 at interface 516 may be any of the arrangements described with reference to FIGS. 3A-3G.

This may include applying an adhesive material to the interface 516, adding heat, surface roughening, etc. to enhance the joining.

The tab portion 514 is joined to the collector body 512 by a joining process at the interface 516 to form junction 518 (S502). The joining process may include applying an adhesive material to the interface 516, adding heat, surface roughening to enhance adhesion, etc. The joining process may be a roll bond welding process at an elevated temperature and pressure, an ultrasonic seam welding process, or a laser welding process.

The joined tab portion 514 and collector body 512 are encased in an electrically conductive overlay material 519 (S503), and the resulting work product including the metal-coated polymer layer 517 that is joined to the solid metal or metallized polymer tab portion 514 may be arranged in a roll, and subsequently sectioned to form the hybrid current collector 510 having tab portion 514 (S504). The step of sectioning includes removing, via a die cutting process or other cutting process, portion 515.

In one embodiment, the hybrid current collector 510 includes the collector body 512 being 10 micrometers thick, with the electrically conductive overlay material 519 being 5 micrometers on each side. This arrangement of the hybrid current collector 510 facilitates the use of known welding techniques to join the plurality of collector tab portions 514, which are solid metal foil elements.

In one embodiment, following joining of the conductive foil to a fusible foil in the form of the collector body 512, the material can be rolled to a consistent thickness with the conductive film being vacuum-deposited on the surface to form an intermediate workpiece. Then, after the roll goes through a battery coating process, the intermediate workpiece can be cut to form a notch that provides the tab portion 514 for welding, with the tab portion 514 being fully conductive.

In this manner, a weld junction between the collector body 512 and the tab portion 514 is consistently and reliably formed, and the tab portions. This configuration improved charging rate capability for faster charging due to lower resistance as compared to other systems employing fusible cells.

In one embodiment, the polymer material within the current collector is able to melt in the presence of a localized overheating event, and may thus prevent a thermal runaway event.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A hybrid current collector for a battery cell electrode, comprising:
   a collector body joined to a tab portion, and encased in an electrically conductive overlay;
   wherein the tab portion is a solid metal member that is fabricated from a homogeneous electrically conductive material;
   wherein the tab portion comprises a conductive polymer;
   wherein the collector body is fabricated from a polymer; and
   wherein the collector body is joined to the tab portion at a junction.

2. The hybrid current collector of claim 1, wherein the electrically conductive overlay completely encases the tab portion and the collector body.

3. The hybrid current collector of claim 1, wherein the electrically conductive overlay comprises one of aluminum, aluminum alloy, copper, or copper alloy.

4. The hybrid current collector of claim 1, wherein the tab portion is fabricated from one of aluminum, aluminum alloy, nickel, copper, or copper alloy.

5. The hybrid current collector of claim 1, wherein the conductive polymer has a color dye embedded therein.

6. The hybrid current collector of claim 1, wherein the tab portion includes a weld zone, and wherein the junction is distal to the weld zone of the tab portion, wherein the junction being distal to the weld zone of the tab portion comprises the junction being displaced from the weld zone sufficient to avoid undoing the junction during welding of the tab portion in the weld zone.

7. The hybrid current collector of claim 1, wherein the polymer comprises one of polyethylene, polyester, nylon, or polyamide materials.

8. The hybrid current collector of claim 1, wherein the collector body is arranged as a planar element.

9. The hybrid current collector of claim 1, further comprising the collector body being a planar element that is arranged as a laminated structure, and including a conductive polymeric film having a first portion of the polymer disposed on a first face and a second portion of the polymer disposed on a second, opposed face.

10. The hybrid current collector of claim 1, further comprising the collector body being a laminated structure including a metallic film having a first portion of the polymer disposed on a first face and a second portion of the polymer disposed on a second, opposed face.

11. A battery cell, comprising:
- a hybrid current collector arranged adjacent to an electrode;
- the hybrid current collector including a collector body joined to a tab portion, and encased in an electrically conductive overlay;
- wherein the collector body is a planar element that is arranged as a laminated structure, and includes a conductive polymeric film having a first portion of the polymer disposed on a first face and a second portion of the polymer disposed on a second, opposed face;
- wherein the tab portion is a solid metal member that is fabricated from a homogeneous electrically conductive material;
- wherein the collector body is fabricated from a polymer; and
- wherein the collector body is joined to the tab portion at a junction.

12. The battery cell of claim 11, wherein the electrically conductive overlay completely encases the tab portion and the collector body.

13. The battery cell of claim 11, wherein the electrically conductive overlay comprises one of aluminum, aluminum alloy, copper, or copper alloy.

14. The battery cell of claim 11, wherein the polymer comprises one of polyethylene, polyester, nylon, or polyamide materials.

15. The battery cell of claim 11, wherein the collector body is arranged as a planar element.

16. The battery cell of claim 11, wherein the tab portion includes a weld zone, and wherein the junction is distal to the weld zone of the tab portion, wherein the junction being distal to the weld zone of the tab portion comprises the junction being displaced from the weld zone sufficient to avoid undoing the junction during welding of the tab portion in the weld zone.

17. The battery cell of claim 11, further comprising the collector body being a planar element that is arranged as a laminated structure, and including a conductive polymeric film having a first portion of the polymer disposed on a first face and a second portion of the polymer disposed on a second, opposed face.

18. The battery cell of claim 11, further comprising the collector body being a laminated structure including a metallic film having a first portion of the polymer disposed on a first face and a second portion of the polymer disposed on a second, opposed face.

* * * * *